United States Patent [19]

Mascotte et al.

[11] 4,099,760
[45] Jul. 11, 1978

[54] GRILL AND BRUSH GUARD AND UTILITY RACK FOR A VEHICLE

[76] Inventors: Lawrence L. Mascotte; Robert L. Rayson, both of 9106 SE. 82nd, Portland, Oreg. 97266

[21] Appl. No.: 793,979

[22] Filed: May 5, 1977

[51] Int. Cl.² .............................................. B60R 19/00
[52] U.S. Cl. ..................................... 293/73; 224/42.08
[58] Field of Search ..................... 16/191, 139; 293/60, 293/34, 35, 36, 41, 73, 90; 224/42.03 R, 42.04, 42.06, 42.07, 42.21, 42.43, 42.44

[56] References Cited

U.S. PATENT DOCUMENTS

| | | | |
|---|---|---|---|
| 1,562,694 | 11/1925 | Farum | 293/73 |
| 2,789,854 | 4/1957 | Hope | 293/73 |
| 3,200,454 | 8/1965 | Gramenzi | 16/191 |
| 3,905,629 | 9/1975 | Kwong | 293/73 |

FOREIGN PATENT DOCUMENTS 557,139  4/1923  France .............................. 224/42.08

*Primary Examiner*—Trygve M. Blix
*Assistant Examiner*—D. W. Keen
*Attorney, Agent, or Firm*—Adrian J. LaRue

[57] ABSTRACT

A grill and brush guard and utility rack for a vehicle includes mountings that are to be secured onto the frame of a vehicle. Upper and lower stops are provided on the mountings. A rectangular frame member having a woven wire mesh secured thereonto is provided with frame-mountings. Pivots pivotally mount the frame-mountings to the mountings with pivots being offset from the center of the frame-mountings so that the frame-mountings engage the upper and lower stops when the frame member is in the up or down position. Securement is provided for securing the frame member in the up or down position against the up or down stops.

4 Claims, 6 Drawing Figures

GRILL AND BRUSH GUARD AND UTILITY RACK FOR A VEHICLE

BACKGROUND OF THE INVENTION

Trucks and recreation vehicles have been provided with mounting means for mounting a spare tire on the front of the vehicle, but the mounting means is used only for mounting the spare tire and not on a frame member that can be used as a utility rack and grill and brush guard.

SUMMARY OF THE INVENTION

The present invention relates to a grill and brush guard for vehicles and more particularly to a grill and brush guard that is pivotally mounted onto mounting means of a vehicle so as to be maintained in an up position, where it acts as a grill and brush guard, and in a down position at which it can be used as a utility rack.

An object of the present invention is to provide a grill and brush guard for use on the front end of a vehicle to protect the front end of the vehicle an the lights thereon.

Another object of the present invention is the provision of mounting means for pivotally mounting a grill and brush guard onto a front end of a vehicle so that it can be in an up position for use as a grill and brush guard or a down position for use as a utility rack.

An additional object of the present invention is to provide up and down stop means on the mounting means against which the grill and brush guard engages.

A still further object of the present invention is the provision of securing means for securing the grill and brush guard in an up or down position against the stop means.

Still an additional object of the present invention is to provide additional mounting means on the grill and brush guard for mounting a spare tire thereon.

These and other objects of the invention will appear more fully from the following description and the accompanying drawings illustrating a preferred embodiment of the invention. It is to be understood that changes may be made from the exact details that are shown and described without departing from the principles of the invention.

DETAILED DESCRIPTION OF THE INVENTION

Figure 1:
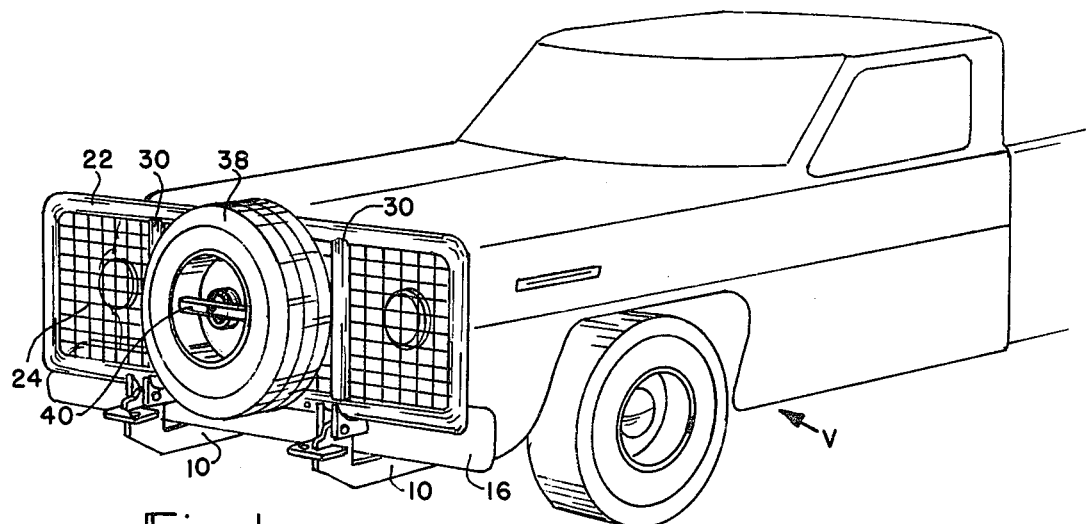
FIG. 1 is a perspective view of the front end of a vehicle with the grill and brush guard in an up position thereon.
Figure 2:
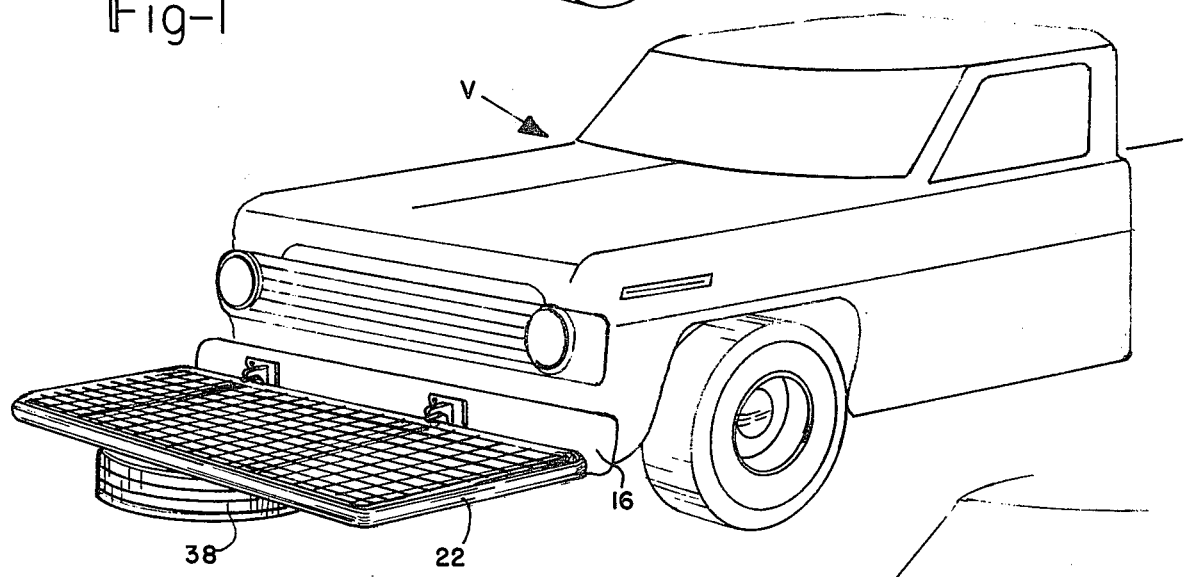
FIG. 2 is a view similar to FIG. 1 with the grill and brush guard in a down position.
Figure 3:
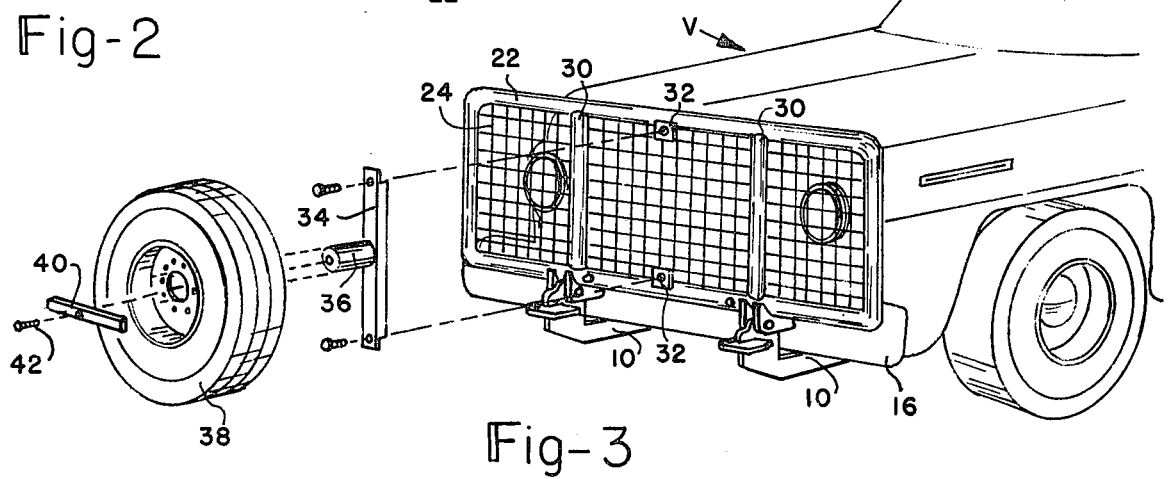
FIG. 3 is an exploded perspective view of the spare tire mounting means of the grill and brush guard.
Figure 4:
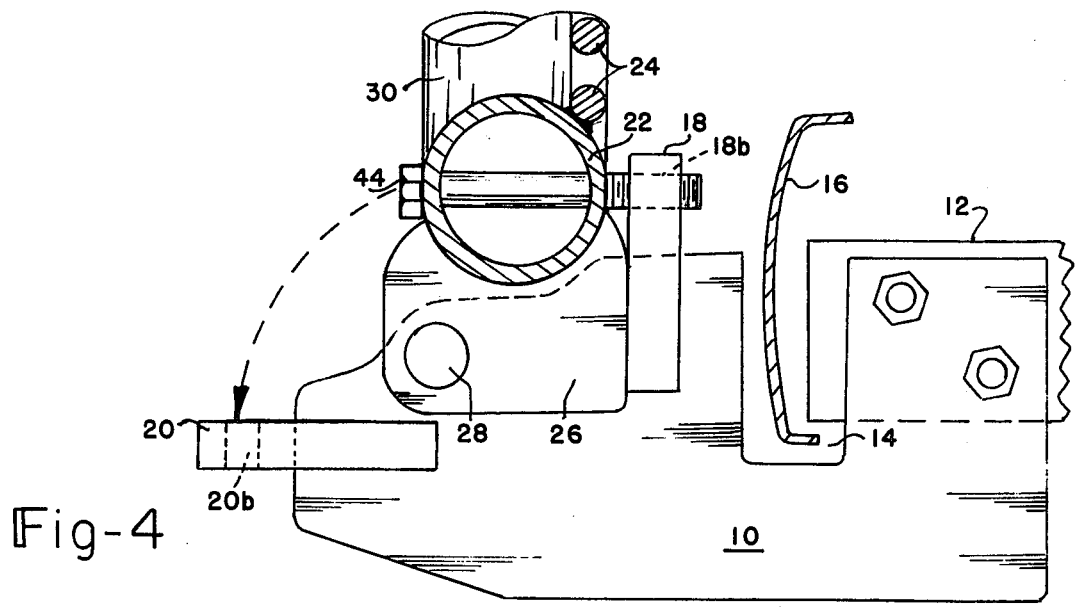
FIG. 4 is a view partly in section showing the mounting, stop and maintaining means for mounting the grill and brush guard onto a vehicle and for maintaining the grill and brush guard in an up position against the stop means.
Figure 5:
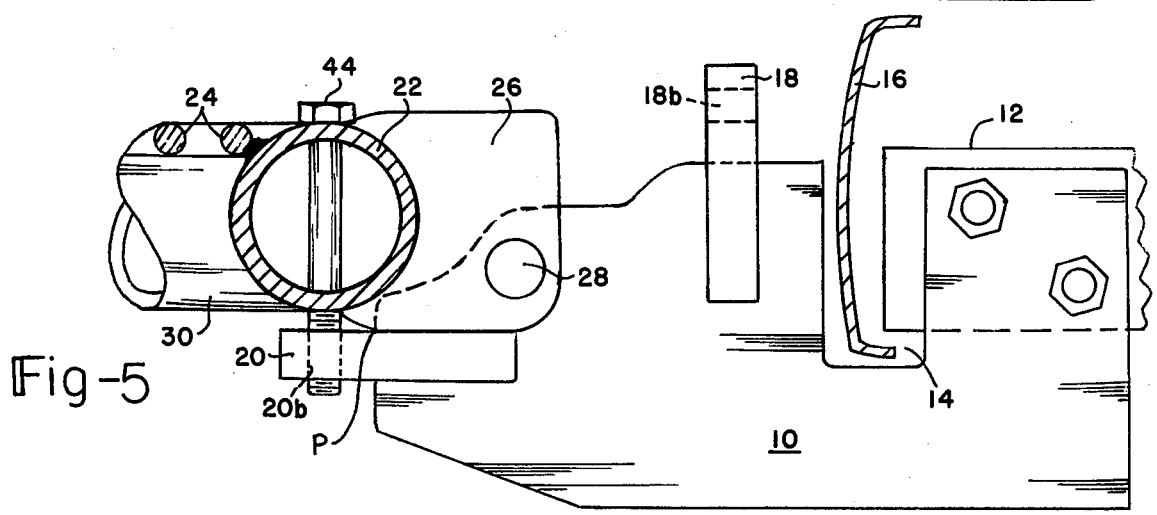
FIG. 5 is a view similar to FIG. 4 showing the maintaining means maintaining the grill and brush guard in a down position against the stop means.
Figure 6:
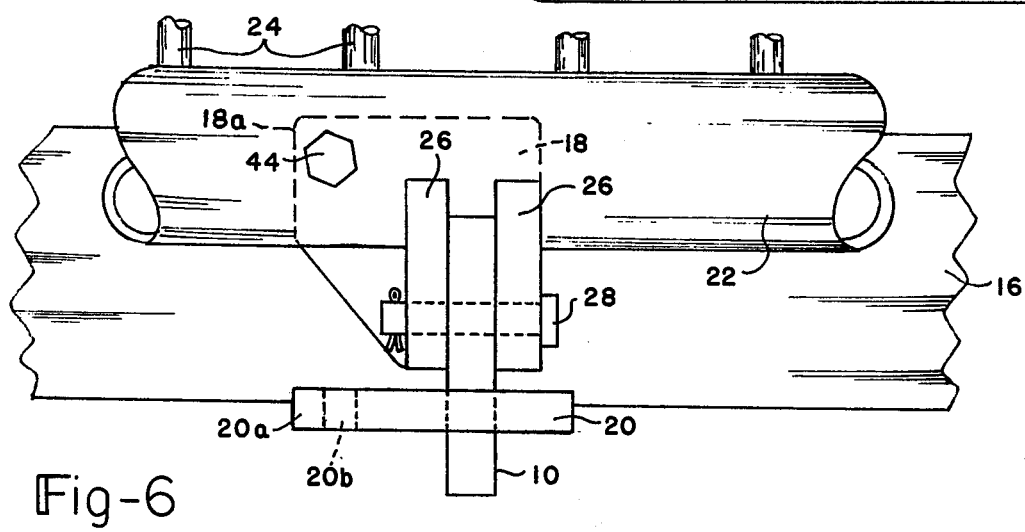
FIG. 6 is a front elevational view of FIG. 4.

Turning now to the drawings, the front end of a vehicle V is shown in FIGS. 1-3 such as for example a pickup truck. Mounting members 10 are secured to the frame 12 of the vehicle as by bolts or welding. Mounting members 10 are provided with a slot 14 in which front bumper 16 is disposed. Upper stop members 18 and bottom stop members 20 are secured onto mounting members 10. Each of stop members 18 is provided with a projection 18a and a threaded hole 18b therethrough. Each of stop members 20 has a projection 20a which has a threaded hole 20b therethrough.

A metal rectangular frame 22 preferably of tubular metal has secured thereto a metal grid 24 and hinge members 26. The hinge members 26 are secured onto frame 22 so as to be pivotally mounted onto mounting members 10 by pivot pins 28. As can be discerned, pivot pins 28 are offset from the center of hinge members 26 in order to provide more surface area for engagement with stop members 18 and 20.

Metal cross-members 30 are provided by frame 22 in order to strengthen it. Metal tabs 32 are located at the center of frame 22 and they extend toward each other. A U-shaped member 34 has its ends bolted to tabs 32, and it has a tubular member 36 secured thereto. A nut (not shown) is secured on the inside of member 34 in alignment with a hole (not shown) in member 34 and tubular member 36. A spare wheel and tire 38 is positioned on tubular member 36 and a metal bar 40 is positioned on the spare wheel and a bolt 42 extends through a central hole in bar 40 and threadably engages the nut secured on member 34 thereby maintaining the spare wheel and tire 38 in position on frame 22.

A bolt 44 extends through a hole in frame 22 in alignment with threaded holes 18b and 20b in order to maintain frame 22 in an up position with hinge members 26 engaging stop members 18 or in a down position with hinge members 26 engaging stop members 20. Frame 22 is spaced from stop members 18 or 20 when hinge members 26 are in engagement with stop members 18 or 20, and, when bolt 44 threadably engages threaded holes 18b or 20b, a preloading takes place because frame 22 is being forced toward stop members 18 or 20 with point P acting as a fulcrum around which the preloading takes place. This minimizes wear on the pivots 28 and rattling of the frame 22. Bolts 44 can be provided adjacent each pair of hinge members 26 or adjacent one pair thereof as desired.

When frame 22 is secured in its up position against stop members 18 via bolt 44, it acts as a grill and brush guard, spare wheel and tire carrier and push guard with spare wheel and tire in position to push vehicles. The metal grid permits light from the vehicle head lights to pass therethrough with very little loss of light. The spare wheel and tire in position on its mounting arrangement also acts as a safety bumper to absorb forces that result from engagement with another vehicle or object thereby minimizing the damage from such engagement.

It can readily be discerned that the above description covers a unique grill and brush guard for hingeable mounting onto a vehicle by a mounting means which is provided with up and down stop means against which hinge means of the grill and brush guard engage in either an up or down position with maintaining means maintaining the grill and brush guard in one of the up or down positions. Although the invention has been explained with reference to a particular embodiment, it is to be appreciated that various adaptations and modifications may be made without departing from the appended claims.

The invention is claimed in accordance with the following:

1. A grill and brush guard for use on a front end of a vehicle comprising:
   mounting means adapted to be secured to the frame means of the vehicle;
   down stop means and up stop means provided on said mounting means;
   frame means having grid wire means secured thereto and hinge means provided thereby;
   pivot means securing said hinge means to said mounting means so that said hinge means engages said up stop means when said frame means is in an up position and said hinge means engages said down stop means when said frame means is in a down position; and
   securing means engaging and directly linking said frame means and said up or down stop means thereby securing said frame means in said up or down position.

2. A grill and brush guard according to claim 1 wherein said frame means is spaced from said up or down stop means whenn said hinge means is in engagement therewith so that said securing means places said frame means in a pre-loaded condition.

3. A grill and brush guard according to claim 1 wherein said pivot means is offset from the center of said hinge means so that said hinge means is provided with more area for engagement with said stop means.

4. A grill and brush guard according to claim 1 wherein a member is provided by said frame means which has a tubular member onto which a spare wheel and tire is mounted and means provided by said members for retaining the spare wheel and tire on said tubular member.

* * * * *